United States Patent
Gervasi et al.

(10) Patent No.: US 6,680,095 B2
(45) Date of Patent: Jan. 20, 2004

(54) CROSSLINKING OF FLUOROPOLYMERS WITH POLYFUNCTIONAL SILOXANES FOR RELEASE ENHANCEMENT

(75) Inventors: David J. Gervasi, West Henrietta, NY (US); George A. Riehle, Webster, NY (US); George J. Heeks, Rochester, NY (US); Arnold W. Henry, Pittsford, NY (US); Santokh S. Badesha, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 67 days.

(21) Appl. No.: 09/772,574

(22) Filed: Jan. 30, 2001

(65) Prior Publication Data

US 2002/0102374 A1 Aug. 1, 2002

(51) Int. Cl.$^7$ .................................................. B32B 9/04
(52) U.S. Cl. ....................... 428/36.8; 428/321; 428/334
(58) Field of Search ............................... 428/36.8, 321, 428/334

(56) References Cited

U.S. PATENT DOCUMENTS

| | | | |
|---|---|---|---|
| 3,998,502 A | 12/1976 | Walter et al. | 308/9 |
| 4,032,699 A | 6/1977 | West, III | 526/18 |
| 4,257,699 A | 3/1981 | Lentz | 355/3 |
| 4,264,101 A | 4/1981 | Gotoh | 296/194 |
| 4,264,181 A | 4/1981 | Lentz et al. | 355/3 FU |
| 4,272,179 A | 6/1981 | Seanor | 355/3 FU |
| 4,323,603 A | 4/1982 | Close | 524/545 |
| 4,777,087 A | 10/1988 | Heeks et al. | 428/321 |
| 5,017,432 A | 5/1991 | Eddy et al. | 428/422 |
| 5,061,965 A | 10/1991 | Ferguson et al. | 355/284 |
| 5,141,788 A | 8/1992 | Badesha et al. | 428/36.8 |
| 5,166,031 A | 11/1992 | Badesha et al. | 430/124 |
| 5,281,506 A * | 1/1994 | Bedesha et al. | 430/124 |
| 5,516,361 A | 5/1996 | Chow et al. | 106/2 |
| 5,695,878 A | 12/1997 | Badesha et al. | 428/334 |
| 5,700,568 A | 12/1997 | Badesha et al. | 428/334 |
| 5,729,813 A | 3/1998 | Eddy et al. | 399/333 |
| 5,736,250 A * | 4/1998 | Heeks et al. | 428/477 |
| 5,945,223 A * | 8/1999 | Kintz et al. | 428/421 |
| 6,361,829 B1 * | 3/2002 | Chen et al. | 427/380 |

FOREIGN PATENT DOCUMENTS

JP          05140402     *  6/1993

* cited by examiner

*Primary Examiner*—Sandra M. Nolan
(74) *Attorney, Agent, or Firm*—Perman & Green, LLP

(57) ABSTRACT

Fluoroelastomer compositions containing polyfunctional tri-aminopolysiloxanes having sterically large siloxane groups are disclosed. Compositions may be cured and are particularly suitable for use as surface release layers for fusing systems used in electrostatographic imaging systems.

10 Claims, No Drawings

CROSSLINKING OF FLUOROPOLYMERS WITH POLYFUNCTIONAL SILOXANES FOR RELEASE ENHANCEMENT

BACKGROUND OF THE INVENTION

1. Field of the Invention

The invention relates to crosslinked fluoropolymer compositions for use as release layer coatings for fuser and transport belts used in electrostatographic printing apparatuses.

2. Description of Related Art

In a typical electrostatographic reproducing apparatus, a light image of an original to be copied is recorded in the form of an electrostatic latent image upon a photosensitive member and the latent image is subsequently rendered visible by the application of electroscopic thermoplastic resin and pigment particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner causes the toner to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor at such elevated temperatures, particularly when the substrate is paper.

Several approaches to thermal fusing of electroscopic toner images have been described. These methods include providing the application of heat and pressure substantially concurrently by various means, such as a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair or plate or belt members. The concurrent transfer of heat and the application of pressure in the nip affects the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

One of the earliest and most successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks et al.

While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

A more recent development in fusing systems involves the use of fluoroelastomer surfaces as fuser members which have a surface with a metal containing filler, which interact with polymeric release agents having functional groups. Such fusing systems, fusing members and release agents, are described in U.S. Pat No. 4,264,181 to Lentz et al. U.S. Pat. No. 4,257,699 to Lentz and U.S. Pat. No. 4,272,179 to Seanor. Typically, the fluoroelastomers used are (1) copolymers of vinylidenefluoride, and hexafluoropropylene, and (2) terpolymers of vinylidenefluoroide, hexafluoropropylene and tetrafluoroethylene. Commercially available materials include: Viton™ E430, Viton GF and other Viton designations which are trademarks of E.I. Dupont deNemours, Inc. as well as the Fluorol™ materials of 3M Company. The preferred curing system for these materials is a nucleophilic system with a bisphenol crosslinking agent to generate a covalently crosslinked network polymer formed by the application of heat following base dehydrofluorination of the copolymer. Exemplary of such fuser member is an aluminum base member with a poly(vinyldenefluoride-hexafluoropropylene) copolymer cured with a bisphenol curing agent and having lead oxide filler dispersed therein, also utilizing a mercapto or amino functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, or other suitable metal compound filler dispersed in the elastomer or resin upon the fuser member surface interacts with the functional groups of the polymeric release agent. Preferably, the metal containing filler materials do not cause degradation or have any adverse effect upon the polymer release agent having functional groups. Because of this reaction between the elastomer having a metal containing filler and the polymeric release agent having functional groups, excellent release and the production of high quality copies are obtained even at high rates of speed of electrostatographic reproducing machines.

While these fluoroelastomers have excellent mechanical and physical properties in that they have a long wearing life thereby maintaining toughness and strength over time in a fusing environment, they have to be used with expensive functional release agents and must contain expensive interactive metal-containing fillers.

More recently, advances have been made in attempts to incorporate the property benefits of both the fluoroelastomers and the silicone elastomers into fusing system surfaces. For example, U.S. Pat. No. 6,035,780 discloses compatibilized blends of fluoroelastomer and polysiloxane elastomer which can be fabricated into films and surfaces having good release and low surface energy properties.

U.S. Pat. No. 5,141,788 to Badesha et al. describes a fuser member comprising a supporting substrate having an outer layer of a cured fluoroelastomer having a thin surface layer of a polyorganosiloxane having been grafted to the surface of the cured fluoroelastomer in the presence of a dehydrofluorinating agent for the fluoroelastomer and having the active functionality from a hydrogen, hydroxy, alkoxy, amino, epoxy, vinyl acrylic, or mercapto group.

U.S. Pat. No. 5,166,031 to Badesha et al. is directed to a fuser member comprising a supporting substrate having an outer layer of a volume grafted elastomer which is a substantially uniform integral interpenetrating network of a hybrid composition of a fluoroelastomer and a polyorganosiloxane which is formed by dehydrofluorination of the fluoroelastomer by a nucleophilic dehydrofluorinating agent followed by addition polymerization by the addition of an alkene or alkyne functionally terminated polyorganosiloxane and a polymerization initiator.

Amino silanes have been used as crosslinking or coupler agents in curing systems for fluoropolymers. For example, U.S. Pat. No. 5,700,568 discloses the use of aminoalkyl functional silanes having amino functionality at one end of the molecule and trialkoxy silane functionality at the other end of the molecule as both dehydrofluorinating agents and crosslinking agents for fluoropolymers. U.S. Pat. No. 4,323,603 discloses the use of aminosilanes having the formula $RCH_2CH_2CH_2R^1{}_{3n-1}(OR^{11})_n$, where R is amine or epoxy, $R^1$ is C, $—C_5$ alkyl, $OR^{11}$ is a hydrolyzable alkoxy group and n is 1, 2 or 3, as crosslinking agents for fluoropolymers.

However, none of the heretofore known siloxane crosslinking agents provides sufficient siloxane functionality in the cured fluoroelastomer surface to impart the release benefit of silicone elastomer into such surfaces or to provide significantly improved compatibility with common fuser oils applied to the surface during printing.

SUMMARY OF THE INVENTION

The present invention provides for a curable fluroelastomer composition comprising a mixture of at least one fluoropolymer comprising a copolymer or terpolymer of vinylidene fluoride with at least one comonomer selected from the group consisting of tetrafluoroethylene and hexafluoropropylene and a triaminopolysiloxane having the structure:

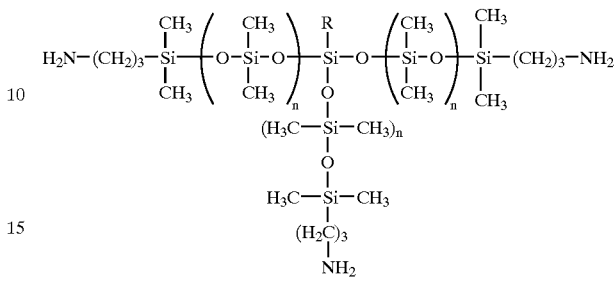

Wherein R is $(CH_2)_xCH_3$ where x is a whole integer from 0 to 3 and n is a whole integer ranging from 0 to about 10. Preferably x is at least 1 and n is at least 1.

The invention also provides a fuser system member used in electrostatographic printing applications wherein a supporting substrate such as a fuser roll or belt contains an outer release layer comprising the cured elastomer composition of the invention.

The cured composition provides for a lower surface energy coating having enhanced toner release properties thereby reducing the tendency for toner to offset back to the surface of the fuser member during the electrostatographic printing process. The cured composition also exhibits improved affinity for silicone and aminosilicone fuser release oils which are applied to the coating surface during the printing operation because of the improved compatibility of such oils and the triaminopolysiloxane component of the release surface.

DETAILED DESCRIPTION OF THE INVENTION

The triaminopolysiloxane component of the present invention serves at least three basic functions. One, it functions as a dehydrofluorinating agent for the fluoropolymer component of the composition. Second, it functions as a primary or auxiliary crosslinking agent for the fluoropolymers. Third, it improves the compatibility of the fuser surface and silicone release oils which may be applied to the fuser surface during the printing process, thereby improving the toner release properties of the surface. It is believed that these properties are enhanced because the structure of the triaminopolysiloxane provides a bulky, highly structured siloxane backbone on the surface of the outer fuser layer which tends to blanket or sterically hinder the fluoroelastomer portion of the layer due to the tendency of the polysiloxane portion of the layer to orient towards the surface.

Suitable fluoroelastomers which provide the fluoroelastomeric component of this invention are perfluororubbers of the polymethylene type having all substituent groups on the polymer chain either fluoro, perfluoroalkyl or perfluoroalkoxy groups, and wherein the polymer is free of other halogen substituents such as chlorine groups.

The fluoroelastomers useful in the practice of the present invention are those described in detail in U.S. Pat. No. 4,257,699 to Lentz, as well as those described in commonly assigned U.S. Pat. Nos. 5,017,432 to Eddy et al. and 5,061,965 to Ferguson et al. As described therein, these fluoroelastomers, particularly from the class of copolymers, terpolymers, and tetrapolymers of vinylidenefluoride, hexafluoropropylene, tetra-fluoroethylene, and cure site monomer (believed to contain bromine) are known commercially under various designations such as Viton A, Viton E60C, Viton E430, Viton 910, Viton GH, Viton GF and Viton F601C. The Viton designation is a Trademark of E.I. Dupont deNemours, Inc. Other commercially available materials include Fluorol 2170, Fluorol 2174, Fluorol 2176, Fluorol 2177 and Fluorol LVS 76, Fluorol being a Trademark of 3M Company. Additional commercially available materials include Aflas poly(propylene-tetrafluoroethylene) copolymer, Fluorel II, a poly(propylene-tetrafluoroethylene-vinylidenefluoride) terpolymer both also available from 3M Company. Typically, these fluoroelastomers can be cured with a nucleophilic additive curing system, such as a bisphenol crosslinking agent with an organophosphonium salt accelerator as described in further detail in the above referenced Lentz Patent and in the Eddy et al. patent or with a peroxide in which case a cure site monomer such as bromomethyl perfluorovinyl ether is also necessary.

A particularly preferred embodiment of the hydrofluoroelastomer is that described in U.S. Pat. No. 5,017,432 to Eddy et al. which provides a fuser member surface layer comprising polyvinylidenofluoride-hexafluoropropylene-tetrafluoroethylene-cure site monomer (believed to contain bromine) wherein the vinylidenefluoride is present in an amount less than 40 weight percent and which is cured from a dried solvent solution thereof with a nuclееophilic curing agent soluble in the solvent solution and in the presence of less than 4 parts by weight inorganic base per 100 parts of polymer, the inorganic base being effective to at least partially dehydrofluorinate the vinylidenefluoride. These materials are described in greater detail in U.S. Pat. No. 5,017,432. The nucleophillic curing system is further described in greater detail in U.S. Pat. No. 4,272,179 to Seanor and U.S. Pat. No. 4,264,101 to Lentz et al.

The triaminopolysiloxane component may be present in the composition at a level of from about 1 to 15 wt %, more preferably 1 to 10 wt % based on the weight of the fluoropolymer component.

In one embodiment of the invention, the triaminopolysiloxane itself serves as a crosslinking agent and dehydrofluororination agent for the fluoropolymer component of the composition, and no additional curing agents are necessary. However, because of the bulky nature of the triaminopolysiloxane molecules, there may be insufficient density of terminal amino groups available to sufficiently crosslink the polymers, resulting in a loosely crosslinked, gummy vulcanizate. It is thus preferred to also include in the composition a conventional dehydrofluorinating agent and crosslinking agent as are known in the art, although smaller than normal quantities may be used.

Nucleophilic curing systems may include a bispehnol crosslinking agent and an organophosphonium salt accelerator. Typically, the curing process takes place in the presence of 8 to 10 parts by weight of inorganic base per 100 parts of polymer. The inorganic base dehydrofluorinates the vinylideneflouride in the polymer creating double bonds which act as reactive sites for crosslinking. However, the presence of excess base results in the long term degradation of the elastomers and if excess base continues to dehydrofluorinate the vinylidenefluoride generating double bonds which cause the toner member to harden, subsequent oxidation causes the surface energy to increase and the release performance to degrade. Thus, it is preferred to cure the polymer at a relatively low base level to control the reactivity of the vinylidenefluoride.

A typical nucleophilic curing system is disclosed in U.S. Pat. No. 4,272,179, the complete disclosure of which is incorporated herein by reference.

Other curatives which can be employed include peroxides, hydrides, bases, oxides, amines and the like. Examples of strong nucleophilic agents include primary, secondary and tertiary aliphatic and aromatic amines, as well as amino silanes such as disclosed in U.S. Pat. Nos. 5,700,568 and 5,729,813, the complete disclosure of which patents are incorporated herein by reference.

Other adjuvants and fillers may be incorporated in the elastomer composition in accordance with the present invention provided that they do not adversely effect the integrity of the fluoroelastomer. Such fillers normally encountered in the compounding of elastomers include coloring agents, reinforcing fillers such as carbon black and silica, and processing aids. Also: Aluminum oxide, lens oxide, indium tin oxide, antimony tin oxide, silicon carbide, zinc oxide and boron nitride may be included as fillers, which may be present at a level of from about 1–20 volume %. Oxides such as copper oxides may be added in certain amounts such as, for example, from about 1 to about 10 volume percent, to fuser roll coatings to provide sufficient anchoring sites for functional release oils and thereby allow excellent toner release characteristics from such members. Fillers may optionally be pre-treated or treated in solution with silane coupling agents to improve filler incorporation into the polymer network.

The substrate for the fuser member of the fuser system assembly may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the substrate takes the form of a cylindrical tube of aluminum, copper, steel or certain plastic materials chosen to maintain rigidity and structural integrity as well as being capable of having the elastomer coated thereon and adhered firmly thereto. The diameter of the substrate is from about 10 to about 100 mm, and preferably from about 40 to about 75 mm. It is preferred that the supporting substrate is a cylindrical sleeve having an outer layer of from about 1 to about 6 mm. In one embodiment, the core, which may be a steel cylinder is degreased with a solvent and cleansed with an abrasive cleaner prior to being primed with a primer, such as Dow Corning 1200, which may be sprayed, brushed or dipped, followed by air drying under ambient conditions for thirty minutes and then baked at 150° C. for 30 minutes.

The outer layer of the fuser member is preferably prepared by dissolving the fluoropolymer in a typical solvent such as methyl ethyl ketone, methyl isobutyl ketone and the like. The triaminopolysiloxane is then added to this solution. A nucleophilic dehydrofluorinating agent is then added followed by stirring for 1 to 60 minutes at 45° to 85° C. The resulting solution is then used to fabricate the outer layer of a fuser member by conventional solution coating methods, spraying, dipping, flow coating, or the like. The coating thickness can vary depending upon specific applications from about 10 to about 250 micrometers thick. The coating is first air dried and then step heat cured in air. For fuser applications, the thickness of the dry fluoroelastomer layer could be any suitable thickness, for example, from 25 to about 75 and preferably from about 35 to about 50 micrometers. This thickness range is selected to provide a layer thin enough to prevent a large thermal barrier for fusing and thickness enough to allow a reasonable wear life. While molding, extruding and wrapping techniques are alternative application means which may be used, it is preferred to spray or flow-coat successive applications of the solvent solution. When the desired thickness of coating is obtained, the coating is cured and thereby bonded to the roll surface.

The curing time, is for example, from about 30 minutes to about 24 hours and the preferred time is from about 1 to 4 hours, and particularly preferred is from about 1 to about 2 hours. The temperature for curing is from about 100° to about 150° C., and preferably from about 130° to about 150° C.

The following example is illustrative of the invention.

As used in the example, Viton GF is a terpolymer of 35 wt % vinylidene flouride, 34 wt % hexafluoropropylene and 29 wt % tetrafluoroethylene available from Dupont, and UCT PS401 is a t-branched triaminopolysiloxane of the structure set forth in the summary section of this disclosure and available from United Chemical Technologies of Bristol, Pa.

EXAMPLE 1

A metal roller or stainless steel or fabric belt substrate with an intermediate layer of a silicone elastomer can be overcoated with the composition of the present invention via flow coating or spray coating to a film thickness of approximately 10–50 microns. The first step in preparing the over coat is accomplished by dissolving 500 grams of Viton GF in approximately 5 liters of methylisobutylketone (MIBK). To this solution is then added a second solution containing 25 grams (5 pph) of a t-branched aminosiloxane UCT PS401. After the combined formulation is sufficiently mixed on a roll mill for approximately 1–2 hours, 250 grams of a 10% by weight solution of Viton Curative 50 (VC-50, available from Dupont Dow Elastomers) also containing 5 gram (1 pph) Calcium hydroxide and 10 grams (2 pph) Magnesium Oxide is added to the Viton GF solution. The resulting formulation is blended for approximately 15 minutes and coated onto the silicone surface of a belt or roll. Following a post-cure step of 450° F. for 24 hours, the finished part can be used in a fusing or transfix member, exhibiting enhanced release as a result of possesing a silicone component more compatible with common fuser release fluids.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A curable fluoroelastomer composition comprising a mixture of at least one fluoropolymer comprising a copolymer or terpolymer of vinylidene fluoride with at least one comonomer selected from the group consisting of tetrafluoroethylene and hexafluoropropylene and a triaminopolysiloxone having the structure:

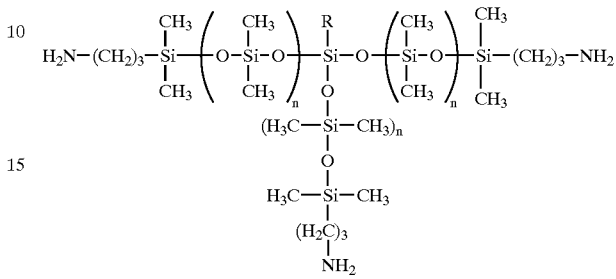

wherein R is $(CH_2)_x CH_3$ where x is a whole integer from 0 to 3 and n is a whole integer ranging from about 0 to about 10.

2. The composition of claim 1 wherein said polysiloxane is present in said composition at a level of from about to 1 about 15 wt %, based on the weight of said fluoropolymer.

3. The composition of claim 1 wherein said fluoropolymer is a terpolymer of vinylidene fluoride, tetrafluoroethylene and hexafluoropropylene.

4. The composition of claim 1 further containing a dehydrofluorinating agent different from said triaminopolysiloxane.

5. The composition of claim 4 further containing a nucleophilic crosslinking agent.

6. The cured composition of claim 1.

7. A fuser system member comprising a supporting substrate an outer surface layer comprising the cured composition of claim 6.

8. The fuser system member of claim 7 wherein the supporting substrate is a fuser roll, a pressure roll or a release agent donor roll.

9. The fuser system member of claim 7 wherein the supporting substrate is a cylindrical sleeve, a drum or a belt.

10. The fuser system member of claim 7 wherein said outer surface layer has a thickness of about 10 to 250 micrometers.

* * * * *